(12) United States Patent
Rego

(10) Patent No.: US 9,222,603 B2
(45) Date of Patent: Dec. 29, 2015

(54) CORD SUPPORT BRACKET

(71) Applicant: Lawrence Rego, Old Lyme, CT (US)

(72) Inventor: Lawrence Rego, Old Lyme, CT (US)

( * ) Notice: Subject to any disclaimer, the term of this patent is extended or adjusted under 35 U.S.C. 154(b) by 0 days.

(21) Appl. No.: 14/169,779

(22) Filed: Jan. 31, 2014

(65) Prior Publication Data
US 2014/0291456 A1   Oct. 2, 2014

Related U.S. Application Data

(63) Continuation-in-part of application No. 13/851,887, filed on Mar. 27, 2013, now abandoned.

(51) Int. Cl.
*F16L 3/22* (2006.01)
*F16L 3/12* (2006.01)

(52) U.S. Cl.
CPC .............. *F16L 3/221* (2013.01); *F16L 3/1211* (2013.01)

(58) Field of Classification Search
CPC .............. F16L 3/11; F16L 3/14; F16L 3/133; F16L 3/1211; F16L 3/1222; F16L 3/22; F16L 3/221; F16L 3/227; H02G 3/34; H01R 13/5804
USPC ........... 248/59, 73, 68.1, 69, 224.7, 317, 343, 248/158, 127, 74.1–74.2, 74.5, 230.9, 683, 248/537, 206.5, 309.4, 49, 56–58, 61–64; 52/506.06, 39; 403/200, 192, 199; 411/397; 182/142, 150, 128; 174/135, 174/84 C, 75 C, 659–660, 655, 666, 40 CC; 24/22, 23 R, 535; 138/104, 106, 161; 285/9.1; 269/8, 276; 267/1.5, 150, 158, 267/160, 164; 211/187–189
See application file for complete search history.

(56) References Cited

U.S. PATENT DOCUMENTS

| | | | | |
|---|---|---|---|---|
| 948,902 A | * | 2/1910 | Noyes | 248/59 |
| 1,190,971 A | | 7/1916 | Williams | |
| 1,852,363 A | * | 4/1932 | Parent | 165/162 |
| 1,920,899 A | | 8/1933 | Sullivan | |
| 2,161,782 A | * | 6/1939 | Flower | 248/59 |
| 2,506,398 A | | 5/1950 | Thomas, Jr. | |
| 2,567,463 A | * | 9/1951 | Atkinson | 248/68.1 |
| 2,661,483 A | | 12/1953 | Tortorice | |
| 2,846,169 A | * | 8/1958 | Sullivan | 248/62 |
| 2,880,949 A | * | 4/1959 | Fuss | 248/70 |
| 2,912,263 A | | 11/1959 | Christy | |
| 3,042,352 A | | 7/1962 | Stamper | |
| 3,132,831 A | | 5/1964 | Stamper | |
| 3,202,297 A | * | 8/1965 | Hardy | 211/163 |
| 3,279,014 A | | 10/1966 | Fischer | |
| 3,530,899 A | | 9/1970 | Breeding | |
| 3,582,029 A | | 6/1971 | Moesta | |
| 3,682,422 A | | 8/1972 | Evans | |
| 3,716,650 A | | 2/1973 | de Mecquenem | |
| 3,854,684 A | * | 12/1974 | Moore | 248/68.1 |
| 3,960,350 A | * | 6/1976 | Tardoskegyi | 248/589 |

(Continued)

FOREIGN PATENT DOCUMENTS

DE   4009988 A1   10/1991
JP   01261587 A   10/1989

*Primary Examiner* — Ingrid M Weinhold
(74) *Attorney, Agent, or Firm* — Hammer & Associates, P.C.

(57) ABSTRACT

Sleeves are attached to a bracket bar to support multiple chords. The solid sleeves are mounted to the bracket bar in a substantially parallel orientation. The sleeves are configured to receive and support cords. Clamps may be attached to the sleeves and may secure the cords within the sleeves.

7 Claims, 7 Drawing Sheets

(56) References Cited

U.S. PATENT DOCUMENTS

| | | | |
|---|---|---|---|
| 4,006,874 A | 2/1977 | McGee | |
| 4,114,846 A | 9/1978 | Petersen | |
| 4,130,138 A * | 12/1978 | Swanstrom | 138/109 |
| 4,393,998 A | 7/1983 | Allen et al. | |
| 4,505,010 A | 3/1985 | Arenhold | |
| 4,807,838 A * | 2/1989 | Anderson | 248/188.1 |
| 4,934,650 A * | 6/1990 | LeKuch et al. | 248/613 |
| 5,100,086 A * | 3/1992 | Rinderer | 248/49 |
| 5,141,186 A | 8/1992 | Cusic | |
| 5,226,770 A * | 7/1993 | Watson | 411/397 |
| 5,372,341 A * | 12/1994 | Witherbee et al. | 248/49 |
| 5,428,936 A * | 7/1995 | Roth | 52/704 |
| 5,702,077 A * | 12/1997 | Heath | 248/59 |
| 5,876,000 A * | 3/1999 | Ismert | 248/65 |
| 5,881,653 A * | 3/1999 | Pfister | 108/147.13 |
| 5,971,329 A * | 10/1999 | Hickey | 248/68.1 |
| 6,040,525 A | 3/2000 | Chauquet et al. | |
| 6,166,910 A * | 12/2000 | Ronberg et al. | 361/724 |
| 6,484,649 B1 * | 11/2002 | Wang | 108/158 |
| 6,727,430 B1 | 4/2004 | Franks, Jr. | |
| 6,902,138 B2 | 6/2005 | Vantouroux | |
| 7,484,697 B1 * | 2/2009 | Nelson | 248/62 |
| 7,723,623 B2 | 5/2010 | Kiely et al. | |
| 7,926,766 B2 * | 4/2011 | Tjerrild | 248/58 |
| 8,136,461 B2 * | 3/2012 | Leng | 108/158 |
| 8,763,645 B2 * | 7/2014 | Hendershot | 138/107 |
| 2005/0258316 A1 * | 11/2005 | Lin et al. | 248/127 |
| 2008/0053680 A1 | 3/2008 | Kiely et al. | |
| 2010/0006709 A1 | 1/2010 | Bleus et al. | |
| 2010/0279530 A1 | 11/2010 | Auray et al. | |
| 2012/0267483 A1 * | 10/2012 | Colvin | 248/62 |

* cited by examiner

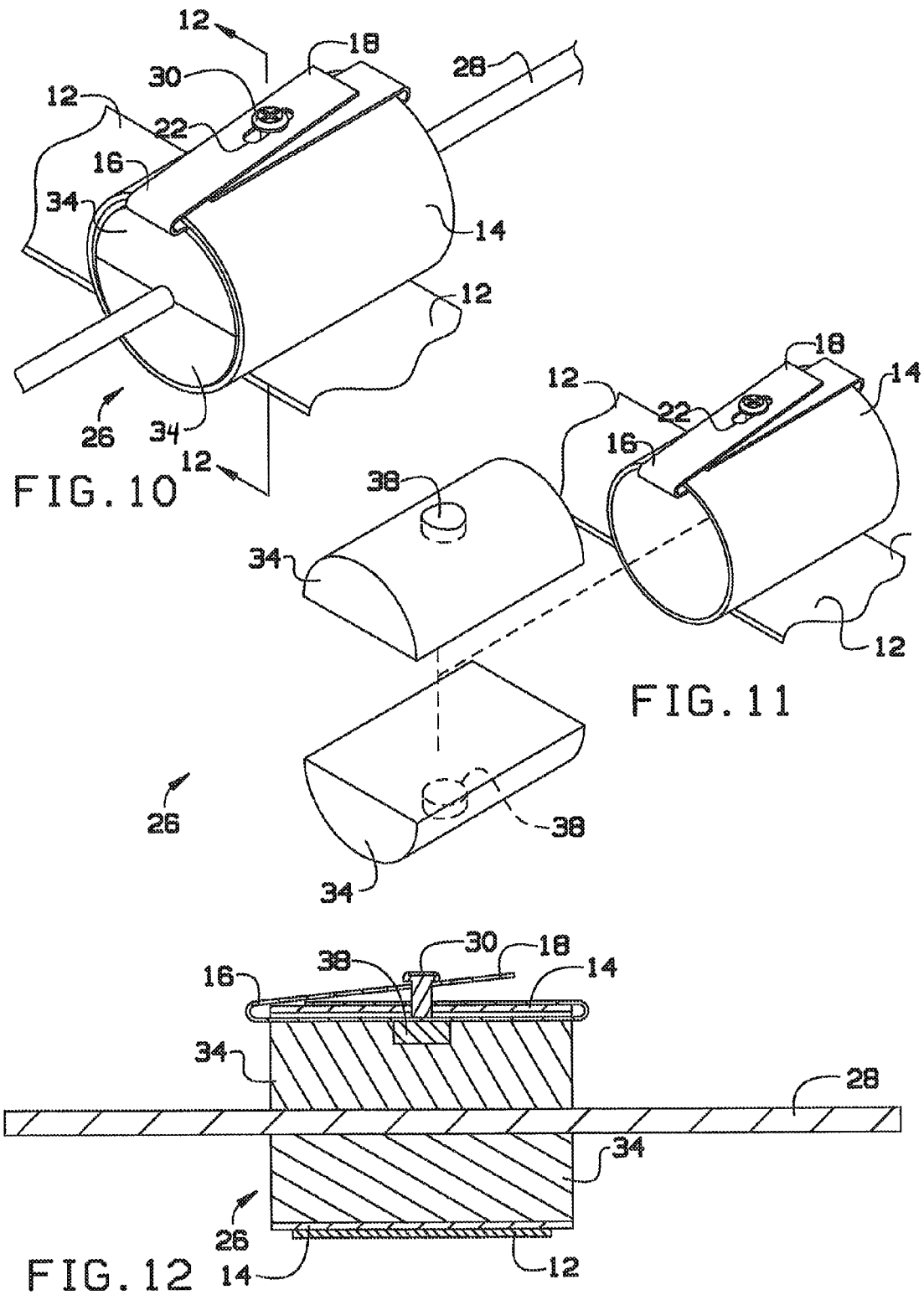

CORD SUPPORT BRACKET

CROSS-REFERENCE TO RELATED APPLICATION

This application is a continuation-in-part of application Ser. No. 13/851,887, filed Mar. 27, 2013.

BACKGROUND OF THE INVENTION

The present invention relates to a cord support bracket device and, more particularly, to a cord support bracket that organizes and supports cords.

Conventional methods for installing all types of cords, such as cables and conduits require individual supports for the cords using straps or hangers. When multiple conduits are installed, the installer regularly builds custom racks using perforated channels, which involves using threaded rods, anchor nuts, washers and specialty clamps and fittings, which may be time consuming and expensive to build. When installing multiple types of cables, often the installer must purchase and install cable trays which may also be time consuming to install and expensive.

As can be seen, there is a need for a single device that supports and organizes different types of cords.

SUMMARY OF THE INVENTION

In one aspect of the present invention, a cord mounting device comprises: a bracket configured to secure at least one cord, wherein at least one mount hole is formed on the bracket; a support bracket assembly comprising: at least one rod having a top end and a bottom end; and at least one pipe formed to fit over the at least one rod, wherein the top end of the rod is configured to attach to at least one of a wall and a ceiling, and the bottom end of the rod is configured to attach to the bracket bar through the at least one mount hole.

In another aspect of the present invention, a support bracket assembly comprises: a drop in anchor comprising a threaded opening, wherein the threaded opening is aligned with an opening in at least one of a wall and a ceiling; at least one threaded rod comprising a bottom end and a top end, wherein the top end is releasably secured to the threaded opening of the drop in anchor through the opening in the at least one of the wall and the ceiling; a mount flange comprising a base, a shaft and an opening through the base and shaft, wherein the mount flange slidably engages the threaded rod so that the base is pressing against the at least one of the wall and the ceiling; a pipe fitting over the at least one threaded rod; and a lower flange comprising a base, a shaft and a threaded opening going through the base and shaft, wherein the lower flange releasably attaches the bottom end and is tightened so that the pipe fits over the shaft of the mount flange and rests against the base of the mount flange, and the pipe fits over the shaft of the lower flange and presses against the base of the lower flange.

These and other features, aspects and advantages of the present invention will become better understood with reference to the following drawings, description and claims.

BRIEF DESCRIPTION OF THE DRAWINGS

FIG. 10 is a perspective detail view of a cord support bracket having a sleeve insert according to another exemplary embodiment of the present invention;

FIG. 11 is an exploded detail view of the cord support bracket of FIG. 10;

FIG. 12 is a section detail view taken along line 12-12 in FIG. 10;

DETAILED DESCRIPTION OF THE INVENTION

Figure 1:
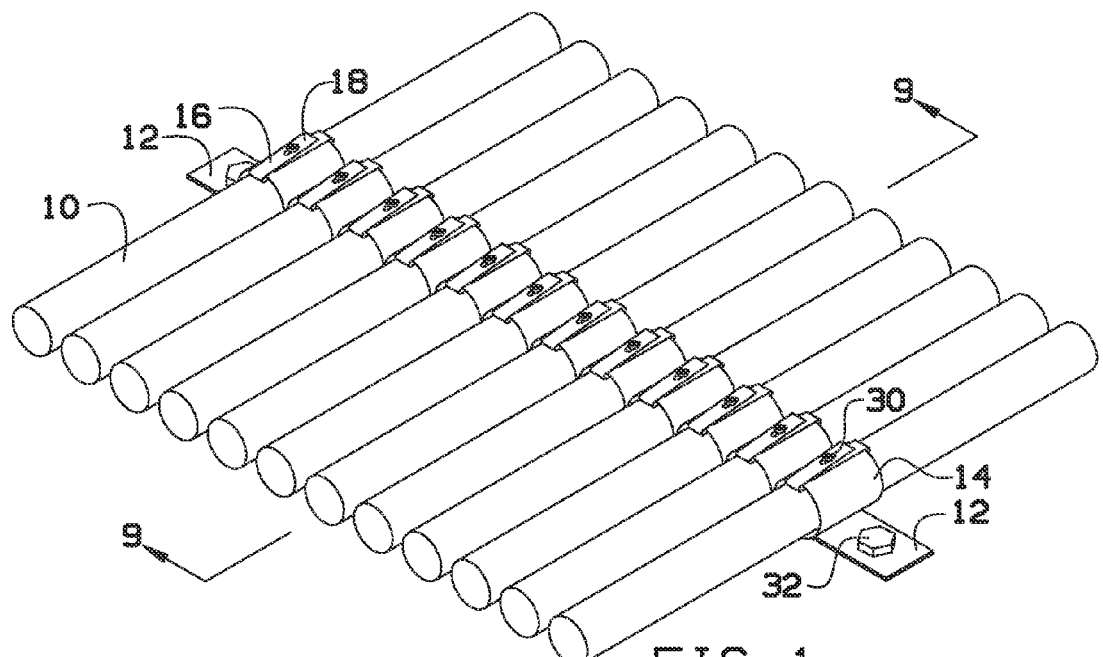
FIG. 1 is a perspective view of a cord support bracket, in use, according an exemplary embodiment of the present invention.
Figure 2:
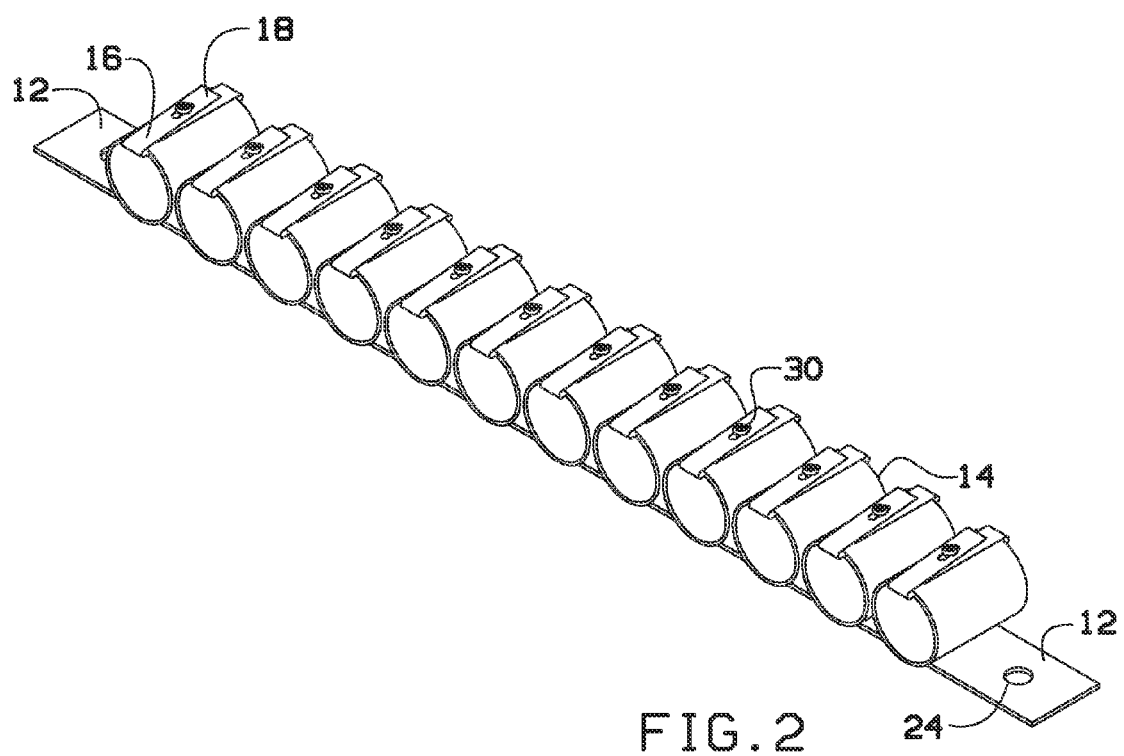
FIG. 2 is a perspective view of the cord support bracket of FIG. 1.
Figure 3:
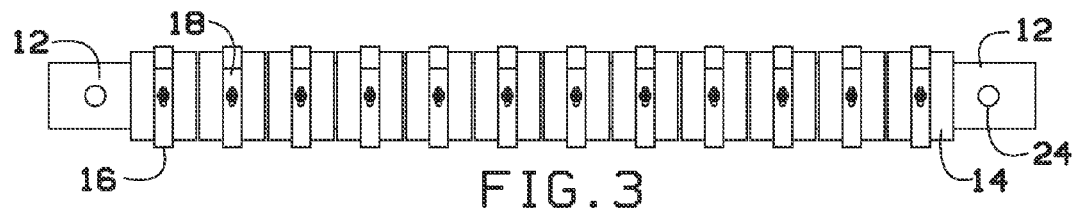
FIG. 3 is a top view of the cord support bracket of FIG. 1.
Figure 4:
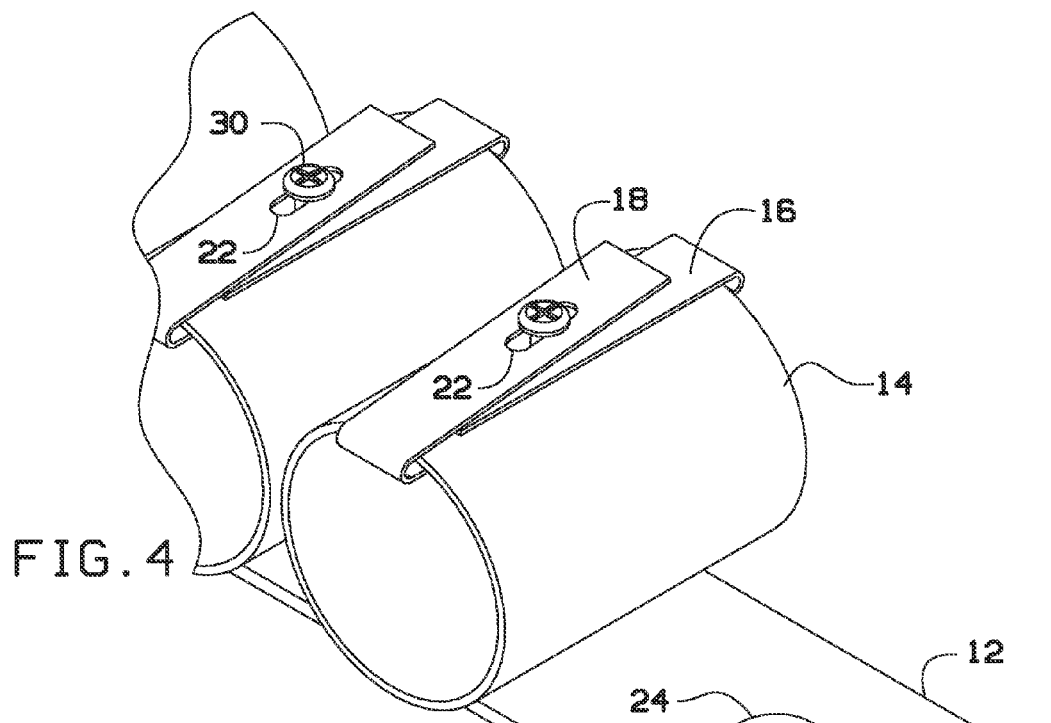
FIG. 4 is a perspective detail view of the cord support bracket of FIG. 1.
Figure 5:
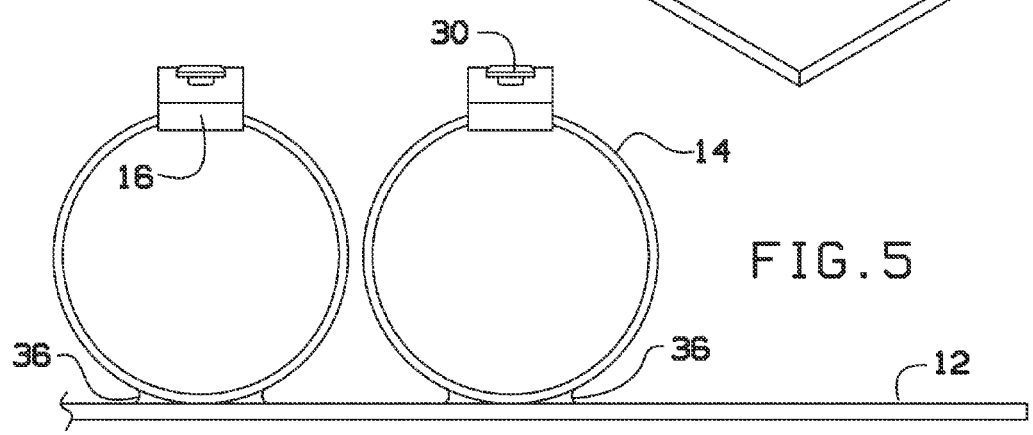
FIG. 5 is a front detail view of the cord support bracket of FIG. 1.

The following detailed description is of the best currently contemplated modes of carrying out exemplary embodiments of the invention. The description is not to be taken in a limiting sense, but is made merely for the purpose of illustrating the general principles of the invention.

Broadly, an embodiment of the present invention provides a plurality of solid sleeves attached to a bracket bar. The solid sleeves are mounted to the bracket bar in a substantially parallel orientation. The solid sleeves are configured to receive and support cords. Clamps may be attached to the solid sleeves and may secure the cords within the solid sleeves.

The present invention may include a universal multiple cord support bracket. The cord may include, but is not limited to, a cable, a wire, a conduit, a hose, a pipe and the like. The present invention may support and neatly arrange multiple various types of cords without the need to individually secure each cord with specialty straps or hangers. Brackets and sleeves can be made from any kind of solid materials. For example the brackets and sleeves may be made of steel, aluminum, stainless steel, bronze, brass, copper as well as certain types of polymers, such as plastics.

The cord may fit through a bracket pipe sleeve and may be secured by clamps. In certain embodiments, the clamp may include a clip. The clip may be placed through the sleeve and bent around the sleeve. The clip may be held in place by a machine screw. As the machine screw is tightened, the metal strip or clip may apply pressure to the cord to secure it.

Referring to FIGS. 1 through 17, the present invention may include a bracket bar 12 and a plurality of sleeves 14. The bracket bar 12 may be a long and narrow support. The sleeves 14 may include a plurality of pipes having an opening configured to receive an exemplary cord 10. In certain embodiments, there may be between around two and up to around twelve support sleeves 14. However, it is envisioned that the device may be made with any desired amount of sleeves 14.

The plurality of sleeves 14 may be mounted to the bracket bar 12. For example, the sleeves 14 may be welded to the bracket bar 14 at welding points 36, such as two welding points 36. The sleeves 14 may be mounted to the bracket 12 in a substantially parallel orientation to one another. The bracket bar 12 may further include a mount hole 24 configured to receive a bolt 32. Thereby, the bracket bar 12 may be mounted to any sound surface, such as walls, floors and the like via the bolt 32.

In certain embodiments, the present invention may further include a clamp 18. The clamp 18 may be attached to a top of each of the sleeves 14. The clamp 18 may be in a loosened position and a tightened position. When a cord 10 is within the sleeve 14, the cord 10 may move freely when the clamp 18 is in the loosened position. When the clamp 18 is in the tightened position, the cord 18 may be secured within the sleeve 14 and thereby may not move freely within the sleeve 14.

Figure 6:
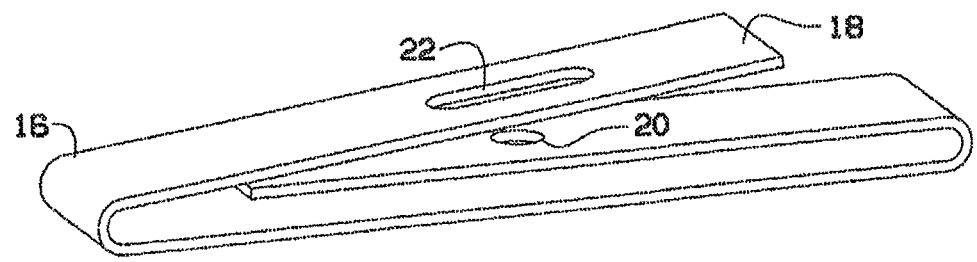
FIG. 6 is a perspective view of a clip used in the cord support bracket of FIG. 1.
Figure 7:
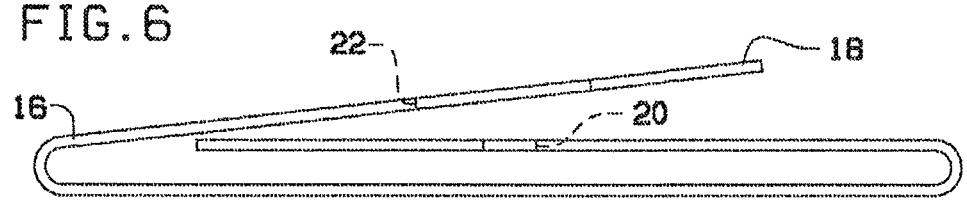
FIG. 7 is a front view of a clip used in the cord support bracket of FIG. 1.
Figure 8:
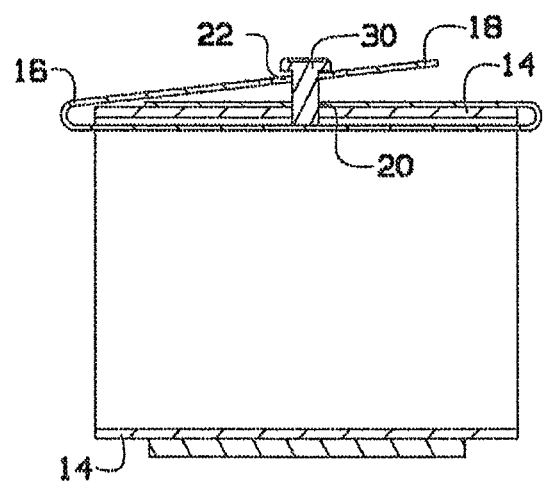
FIG. 8 is a section detail view of the invention along line 8-8 in FIG. 1 illustrated without the exemplary cords.
Figure 9:
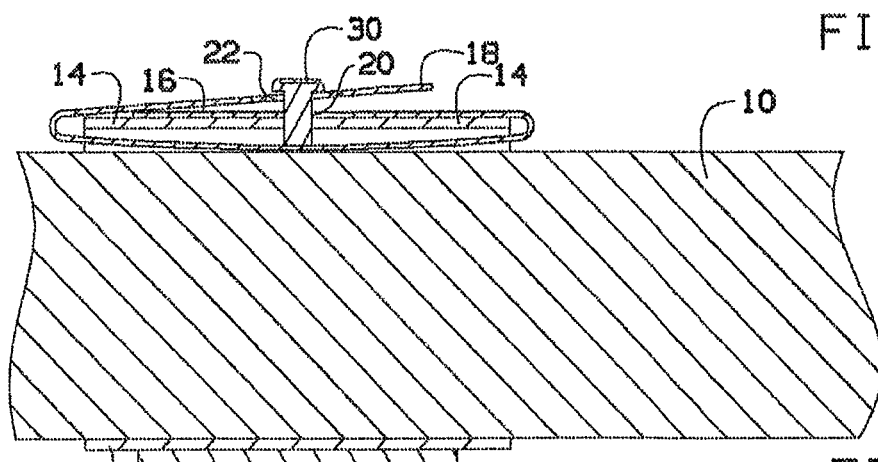
FIG. 9 is a section detail view of the invention illustrated with the exemplary cords and demonstrating interface.
Figure 13:
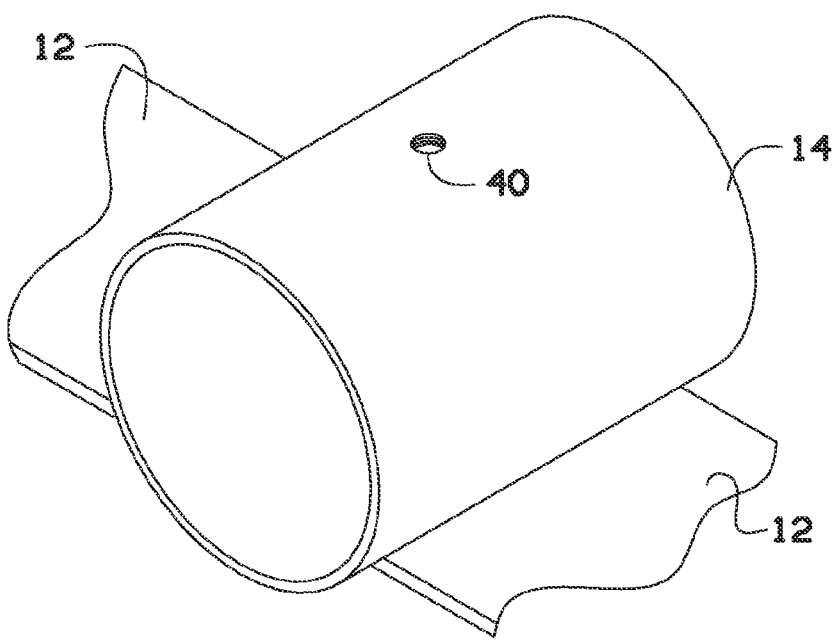
FIG. 13 is a perspective detail view shown without the clip or a machine screw.
Figure 14:
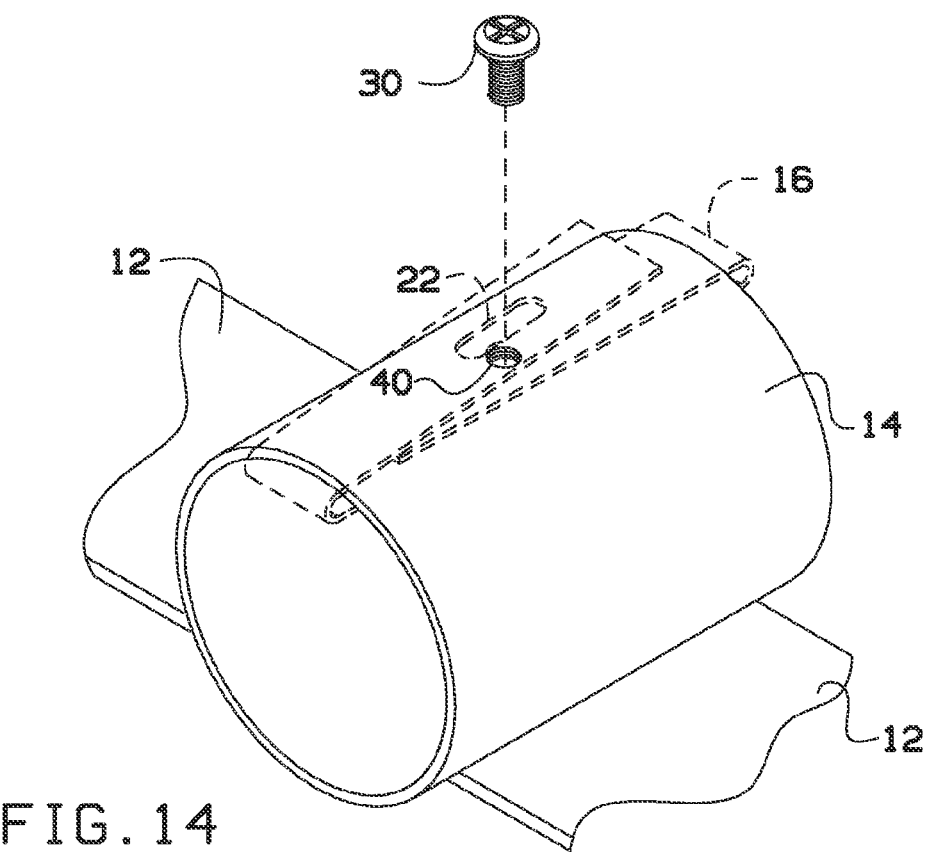
FIG. 14 is an exploded view shown without the clip.

As illustrated in FIGS. 6 and 7, the clamp 18 may include a clip 16 made of a metal strip. The metal strip may be approximately three times the length of the sleeve 14. The clip 16 may include a front portion, a middle portion and a rear portion. The clip 16 may further include a first bend and a second bend. The first bend may be between the front portion and the middle portion and may bend around the front edge of the sleeve 14, and the second bend may be between the middle portion and the end portion and may bend around the rear edge of the sleeve 14.

In such configurations, the front portion may include a front portion opening 22 and the rear portion may include a rear portion opening 20. Further, a sleeve opening 40 may be on the top centerline of the sleeves 14. The front portion opening 22, the rear portion opening 20 and the sleeve opening 40 may align with one another. In certain embodiments, the front portion, the rear portion and the sleeves 14 may each include a plurality of openings for larger sleeve 14 configurations. In certain embodiments, the clip 16 may be installed on the sleeve 14 by placing the strip through the inside of the sleeve 14 and then bending both ends around the sleeve and matching both the front portion opening 22 and the rear portion opening 20.

In certain embodiments, the clamp 18 may further include a screw 30 having a head and a threaded portion. The threaded portion may be configured to screw through the front portion opening, the rear portion opening and the sleeve opening and apply pressure to the middle portion in the tightened position. When the screw 30 is in the tightened position, the middle portion of the clip 16 may be applying pressure to the chord 10, and thereby securing the chord 10. The clip 16 may prevent damage from happening to the cord 10 within the sleeve 14.

As illustrated in FIGS. 10 through 13, the present invention may include a sleeve insert 26. The sleeve insert 26 may be used for when the exemplary cable 28 is too small to fit snuggly within the sleeve 14. The sleeve insert 26 may be constructed of solid material and shaped in the form of a round cylinder configured to fit inside the sleeve opening. In certain embodiments, the sleeve insert 26 may include two half round sections 34. Each half round section 34 may include a magnet 38 embedded in the top section.

When installing the single small diameter wire 28 within the larger bracket sleeve 14, an installer may first pull the wire 28 through the empty sleeve 14. Then both inserts 34, one above the wire 28 and the other below the wire 28, may be installed into the sleeve 14. The magnets 38 may then attract to and attach to the top and bottom sections of the sleeve 14 opening. This may leave a opening space in the middle of the two halves. To secure the wire, the screw 30 may be tightened which may push the clip 16 against the top half 34 and into the bottom half 34 and thereby securing the wire 28 in between the two halves 34.

Figure 15:
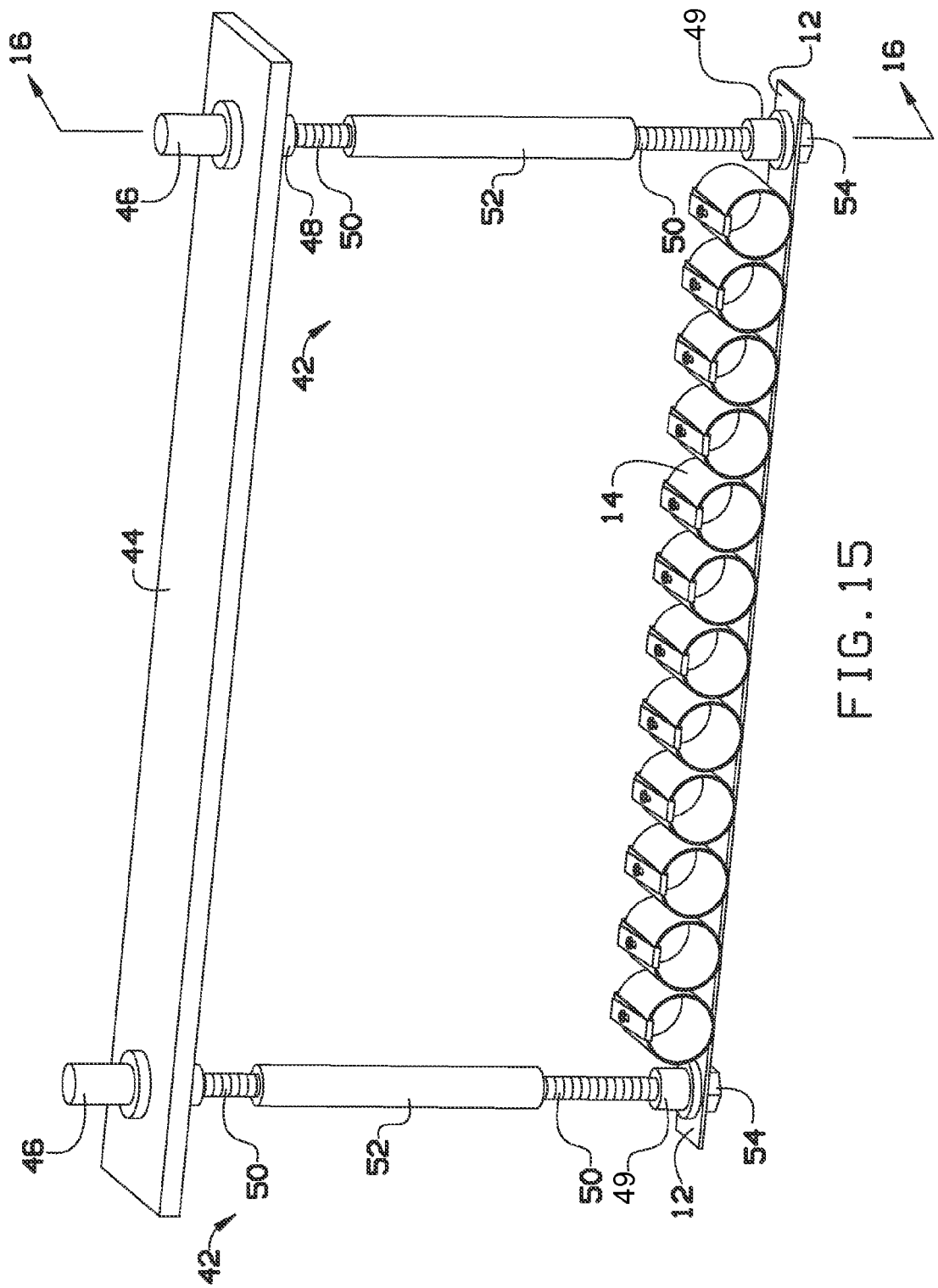
FIG. 15: is a perspective view of an alternate embodiment of the present invention.
Figures 16, 17:
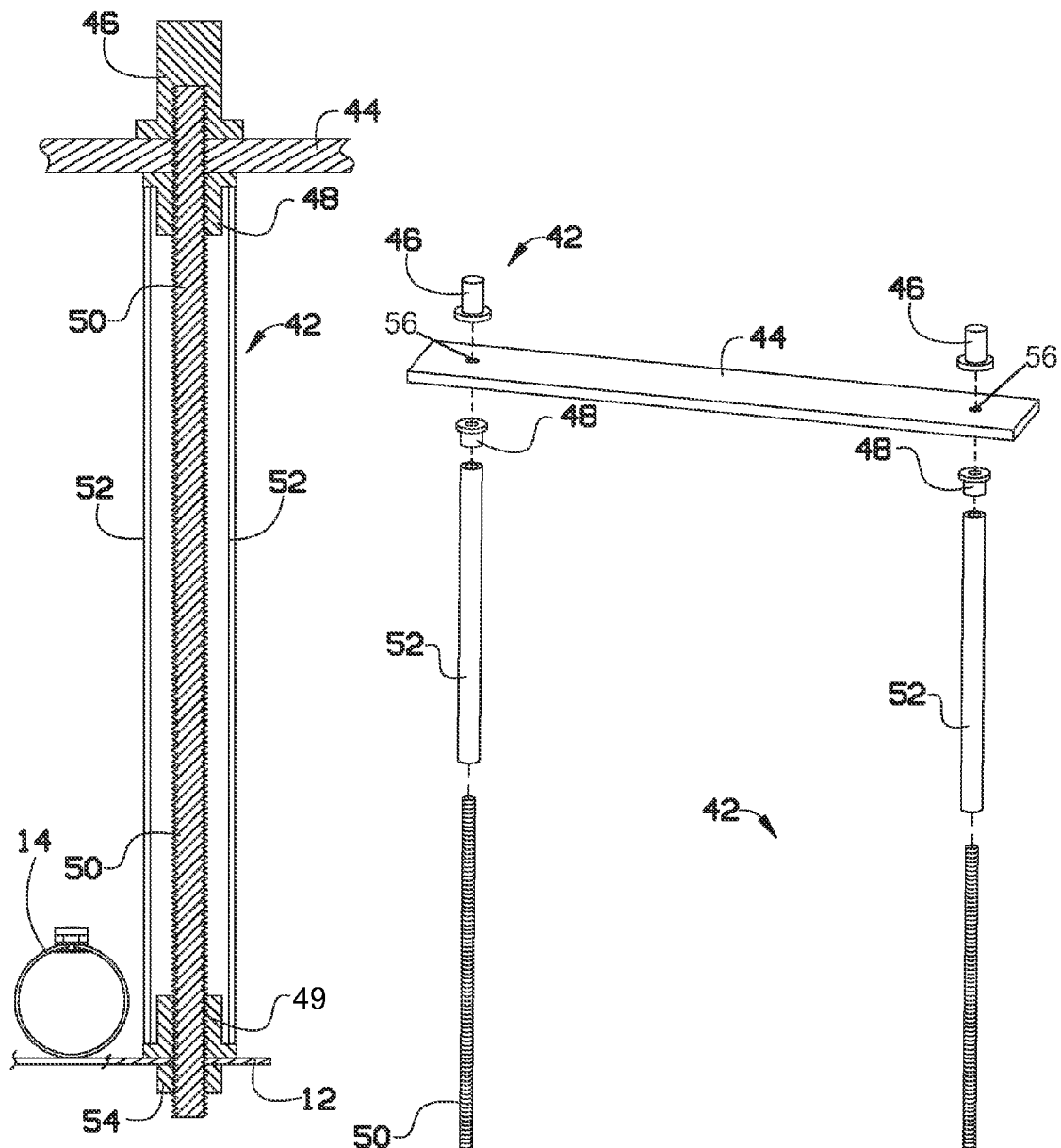
FIG. 16: is a section detail view along line 16-16 in FIG. 15.
FIG. 17 is an exploded view of the alternate embodiment of FIG. 15.

As illustrated in FIGS. 15 through 17, the present invention may further include a support bracket assembly 42 used to secure the bracket bar 12 to an exemplary wall or ceiling 44. The support bracket assembly 42 of the present invention may include at least one lower flange 49 having a base and a shaft. A threaded opening may run through the lower flange 49. The support bracket assembly 42 may further include at least one threaded rod 50 having a top end and a bottom end. The support bracket assembly 42 may further include a drop in anchor 46 having a threaded opening. The drop in anchor 46 may align with a ceiling hole 56. The support bracket assembly 42 may further include a mount flange 48, having a base and a shaft. An opening may run through the mount flange 48. The support bracket assembly 42 may further include a pipe 52. The pipe 52 may fit over the threaded rod 50.

The top end of the threaded rod 50 may run through the opening of the mount flange 48, through the first ceiling opening 56 and into the drop in anchor 46, thereby securing the threaded rod 50 to the ceiling 44. The shaft of the mount flange 48 may be facing away from the ceiling 44 with the base against the ceiling 44. The pipe 52 may slide over the threaded rod 50 and over the shaft of the mount flange 48 and may be secured against the base of the first mount flange 48. The bottom end of the threaded rod 50 may run through the threaded opening of the lower flange 49. The shaft of the lower flange 49 may be facing the ceiling or wall 44. The lower flange 49 may be tightened so that the pipe 52 fits over the shaft of the lower flange 49 and is pressed against the base of the lower flange 49. To mount the bracket bar 12 to the support bracket assembly 42, the bottom end of the threaded rod 50 may fit through a mount hole 24 of the bracket bar 12 and a threaded nut 54 may be secured to the bottom end of the first threaded rod 50.

As illustrated in the Figures, a mount hole 24 may be on either side of the bracket rod 12. Therefore, the bracket rod 12 may be mounted to the ceiling 44 at two points. In such embodiments, the present invention may include two support bracket assemblies including first lower flange 49 and a second lower flange 49, a first threaded rod 50 and a second threaded rod 50, a first drop in anchor 46 and a second drop in anchor 46, a first mount flange 48 and a second mount flange 48, and a first pipe 52 and a second pipe 52. The flanges 48, 49, pipes 52, and threaded rod 50 sizes are all determined by loads and length requirements.

The invention can be used by electricians, as well as cable, data, telephone, security systems and fire alarm installers. Plumbers and HVAC contractors can also benefit by using the invention. The universal support bracket may now allow installers to properly support all types of cords, such as cables or conduits, on a single bracket without the need of specialty fittings. For example, the installation of various sizes of armored cables as well as data, coax, fire alarm cables as well as EMT conduit may be all installed on a single bracket and fastened in place with just two screws or bolts.

It should be understood, of course, that the foregoing relates to exemplary embodiments of the invention and that modifications may be made without departing from the spirit and scope of the invention as set forth in the following claims.

What is claimed is:

1. A cord support device comprises:
   a bracket bar, and a plurality of sleeves mounted on the bracket bar, each sleeve is substantially parallel to one another;
   each sleeve includes:

a separate and individual pipe of a solid material adapted to fit a cord, a sleeve opening, and a clamp attachable to a portion of the sleeve by a screw running through the clamp and the sleeve, the clamp having a loosened position and a tightened position, whereby the cord within the sleeve is secure when the clamp is in the tightened position, the clamp includes:

a clip made of a metal strip having a front portion, a middle portion, a rear portion, a first bend, and a second bend, the first bend is between the front portion and the middle portion and bends around a front edge of the sleeve, and the second bend is between the middle portion and the rear portion and bends around a rear edge of the sleeve, the front portion has a front portion opening and the rear portion has a rear portion opening, wherein the front portion opening, the rear portion opening, and the sleeve opening align with one another, and a screw having a head and a threaded portion, the threaded portion screws through the front portion opening, the rear portion opening, and the sleeve opening, and applies pressure on the middle portion in the tightened position.

2. The cord support device of claim 1 wherein the portion of the sleeve is a top portion of the sleeve.

3. The cord support device of claim 1 wherein the cord comprises a cable, a wire, a hose, a pipe, or a conduit.

4. The cord support device of claim 1 wherein the bracket bar includes a bracket mount hole adapted to receive a bolt.

5. The cord support device of claim 1 further comprises a sleeve insert adapted to fit within the sleeve.

6. A cord support device comprises:

a bracket bar, and a plurality of sleeves mounted on the bracket bar, each sleeve is substantially parallel to one another;

each sleeve is adapted to fit a cord and includes:

a sleeve opening, and a clamp attached to a portion of the sleeve, the clamp includes:

a clip made of a metal strip having a front portion, a middle portion, a rear portion, a first bend, and a second bend, the first bend is between the front portion and the middle portion and bends around a front edge of the sleeve, and the second bend is between the middle portion and the rear portion and bends around a rear edge of the sleeve, the front portion has a front portion opening and the rear portion has a rear portion opening, wherein the front portion opening, the rear portion opening, and the sleeve opening align with one another, and a screw having a head and a threaded portion, the threaded portion screws through the front portion opening, the rear portion opening, and the sleeve opening, and applies pressure on the middle portion in a tightened position to secure the cord.

7. A cord support device comprises:

a bracket bar, and a plurality of sleeves mounted on the bracket bar, each sleeve is substantially parallel to one another;

each sleeve is adapted to fit a cord and includes:

a clamp attached to a portion of the sleeve, the clamp has a loosened position and a tightened position, whereby the cord within the sleeve is secure when the clamp is in the tightened position, and a sleeve insert adapted to fit within the sleeve, the sleeve insert has a cylindrical shape and a first magnetic half and a second magnetic half, wherein in the loosened position, the first magnetic half magnetically attaches to the sleeve, and in the tightened position, the first magnetic half presses against the second magnetic half.

* * * * *